United States Patent [19]
Ilcisin et al.

[11] Patent Number: 6,153,979
[45] Date of Patent: Nov. 28, 2000

[54] CHANNEL MEMBER FOR A PALC PANEL

[75] Inventors: Kevin J. Ilcisin; Thomas S. Buzak, both of Beaverton, Oreg.

[73] Assignee: Tektronix, Inc., Beaverton, Oreg.

[21] Appl. No.: 09/316,602

[22] Filed: May 21, 1999

Related U.S. Application Data

[60] Provisional application No. 60/087,076, May 28, 1998.

[51] Int. Cl.$^7$ ...................................................... H01J 1/88
[52] U.S. Cl. ..................................... 315/169.4; 315/169.3; 313/292; 313/495
[58] Field of Search .............................. 315/169.3, 169.1, 315/169.4; 313/495, 292

[56] References Cited

U.S. PATENT DOCUMENTS 5,811,927  9/1998  Anderson et al. ........................ 313/495
5,859,497  1/1999  Anderson et al. ........................ 313/495

*Primary Examiner*—David Vu
*Attorney, Agent, or Firm*—John D. Winkelman; John Smith-Hill

[57] ABSTRACT

A channel member for a PALC panel includes a transparent plate having a planar surface and first and second electrodes on the planar surface of the transparent plate. The first electrode has a width in the range 35–90 $\mu$m and a height in the range 0.5–30 $\mu$m and the second electrode has a width in the range 30–70 $\mu$m and a height in the range 0.5–30 $\mu$m. A rib is attached to the first electrode and has a width in the range 15–40 $\mu$m, a height in the range 80–200 $\mu$m and a ratio of height to width of at least about 5:1.

3 Claims, 2 Drawing Sheets

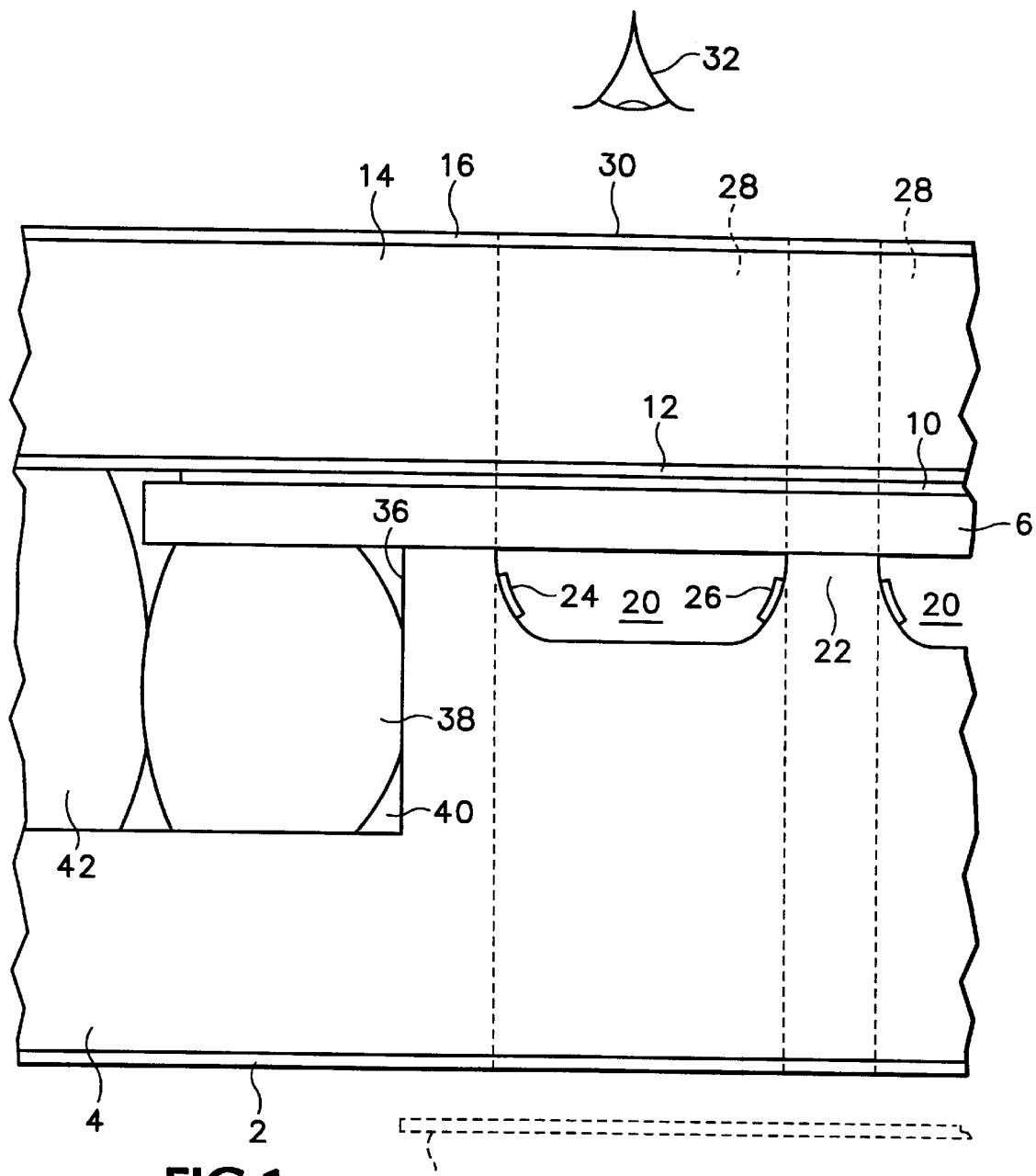
FIG.1
(PRIOR ART)
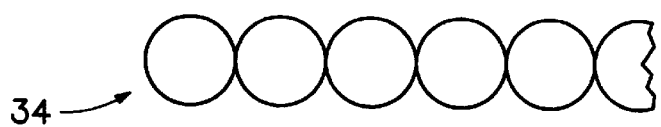

CHANNEL MEMBER FOR A PALC PANEL

CROSS REFERENCED TO RELATED APPLICATIONS

This application claims the benefit of U.S. Provisional Application No. 60/087,076, filed May 28, 1998.

BACKGROUND OF THE INVENTION

This invention relates to a channel member for a PALC panel.

U.S. Pat. No. 5,077,553 discloses apparatus for addressing data storage elements. A practical implementation of the apparatus shown in U.S. Pat. No. 5,077,553 is illustrated schematically in FIG. 1 of the accompanying drawings.

The display panel shown in FIG. 1 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 1), an upper substrate 14 carrying the data drive electrodes, and an upper polarizer 16. In the case of a color display panel, the panel includes color filters (not shown) between the layer 10 and the upper substrate 14. The panel may also include layers for improving viewing angle and for other purposes. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. The region of the upper surface of the display panel that bounds the panel element constitutes a single pixel 30 of the display panel.

When the anode 24 in one of the channels is connected to a reference potential and a suitably more negative voltage is applied to the cathode 26 in that channel, the gas in the channel forms a plasma which provides a conductive path to the reference potential at the lower surface of the cover sheet 6. If a data drive electrode is at the reference potential, there is no significant electric field in the volume element of electro-optic material in the panel element at the crossing of the channel and the data drive electrode and the panel element is considered to be off, whereas if the data drive electrode is at a substantially different potential from the reference potential, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material rotates the plane of polarization of linearly polarized light passing therethrough by an angle which is a function of the electric field in the electro-optic material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the electro-optic material toward the upper polarizer 16 and a viewer 32. If the panel element is off, the plane of polarization of linearly polarized light passing through the volume element of electro-optic material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of electro-optic material. The plane of polarization of light incident on the upper polarizer element is at 0° and therefore the light is blocked by the upper polarizer element and the pixel is dark. If the electric field in the volume element of electro-optic material is intermediate the values associated with the panel element being off and on, light is passed by the upper polarizer element with an intensity which depends on the electric field, allowing a gray scale to be displayed.

In a practical implementation of the PALC display panel, the channel member 4 is etched back around the area in which the channels are formed in order to provide a plateau 36 in which the channels 20 are formed, and the cover sheet 6 is secured to the channel member by an endless frit bead 38 in a rabbet 40 extending around the periphery of the plateau. An upper substrate assembly, including the upper substrate 14 and the data drive electrodes 12 carried thereby, is attached to the channel member 4 by means of a glue bead 42.

There are several techniques for forming the channel member used in a PALC panel. M. Hayashi, A. Seki and T. Togawa, "Development of 25-in. Plasma-Addressed LCD for Multimedia Applications," SID 97 DIGEST, page 383, discloses a method in which the channel member is formed from a glass substrate having planar top and bottom surfaces, the electrodes are deposited on the top surface of the glass substrate, and ribs are constructed on top of the anodes, so that each anode is exposed in two adjacent channels.

It would be desirable to make a channel member in accordance with the structure shown in the SID 97 article where the ribs have an aspect ratio (height:width) of at least about 3:1, since this would allow a particularly advantageous combination of dimensions to be achieved for features characterizing a channel of a high resolution PALC panel.

The maximum aspect ratio of a rib-like structure formed on a support member generally depends on the method used for constructing the rib-like structure. The techniques mentioned in the SID 97 article are not able to form ribs having an aspect ratio greater than about 2:1.

It has been reported in Dempa that KYOCERA has developed a technique for fabricating a glass back plate for a plasma display panel wherein ribs having an aspect ratio as high as 7:1 are created on a glass substrate by applying a coating of paste to the substrate and pressing a mold onto the paste.

SUMMARY OF THE INVENTION

In accordance with a first aspect of the invention there is provided a channel member for a PALC panel comprising a transparent plate having a planar surface, at least first and second electrodes on the planar surface of the transparent plate, the first electrode having a width in the range 35–90 μm and a height in the range 0.5–30 μm and the second electrode having a width in the range 30–70 μm and a height in the range 0.5–30 μm, and a rib attached to the first electrode and having a width in the range 15–40 μm, a height in the range 80–200 μm and a ratio of height to width of at least about 5:1.

In accordance with a second aspect of the invention there is provided a channel member for a PALC panel, comprising a transparent plate having a planar surface, first and second anodes and a cathode on the planar surface of the transparent plate, the first and second anodes each having a width in the range 35–90 μm and a height in the range 0.5–30 μm and the cathode being between the first and second anodes and having a width in the range 30–70 μm and a height in the range 0.5–30 μm, and first and second ribs attached to the first and second anodes respectively and each having a width in the range 15–40 μm, a height in the range 80–200 μm and a ratio of height to width of at least about 5:1.

In accordance with a third aspect of the invention there is provided a PALC panel including a channel member and a cover sheet sealed to the channel member, wherein the channel member comprises a transparent plate having a planar surface, a plurality of parallel strip-form anodes on the planar surface of the transparent plate, each anode having a width in the range 35–90 μm and a height in the range 0.5–30 μm, a plurality of parallel strip-form cathodes on the planar surface of the transparent plate, parallel to the anodes, each cathode being between two adjacent anodes and having a width in the range 30–70 μm and a height in the range 0.5–30 μm, and a plurality of ribs attached to the anodes respectively and each having a width in the range 15–40 μm, a height in the range 80–200 μm and a ratio of height to width of at least about 5:1.

In accordance with a fourth aspect of the invention there is provided a PALC panel including a channel member and a cover sheet sealed to the channel member, wherein the channel member comprises a transparent plate having a plurality of parallel channels in an upper surface thereof separated by ribs each having a width in the range 15–40 μm, a height in the range 80–200 μm and a ratio of height to width of at least about 5:1, an anode and a cathode exposed in each channel.

BRIEF DESCRIPTION OF THE DRAWINGS

For a better understanding of the invention, and to show how the same may be carried into effect, reference will now be made, by way of example, to the accompanying drawings, in which FIG. 1 is a partial sectional view of a PALC display panel in accordance with the prior art.

In the several figures of the drawings, like reference numerals designate like or corresponding components.

In this specification, words of orientation and position, such as upper and lower, are used to establish orientation and position relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

Figure 2:
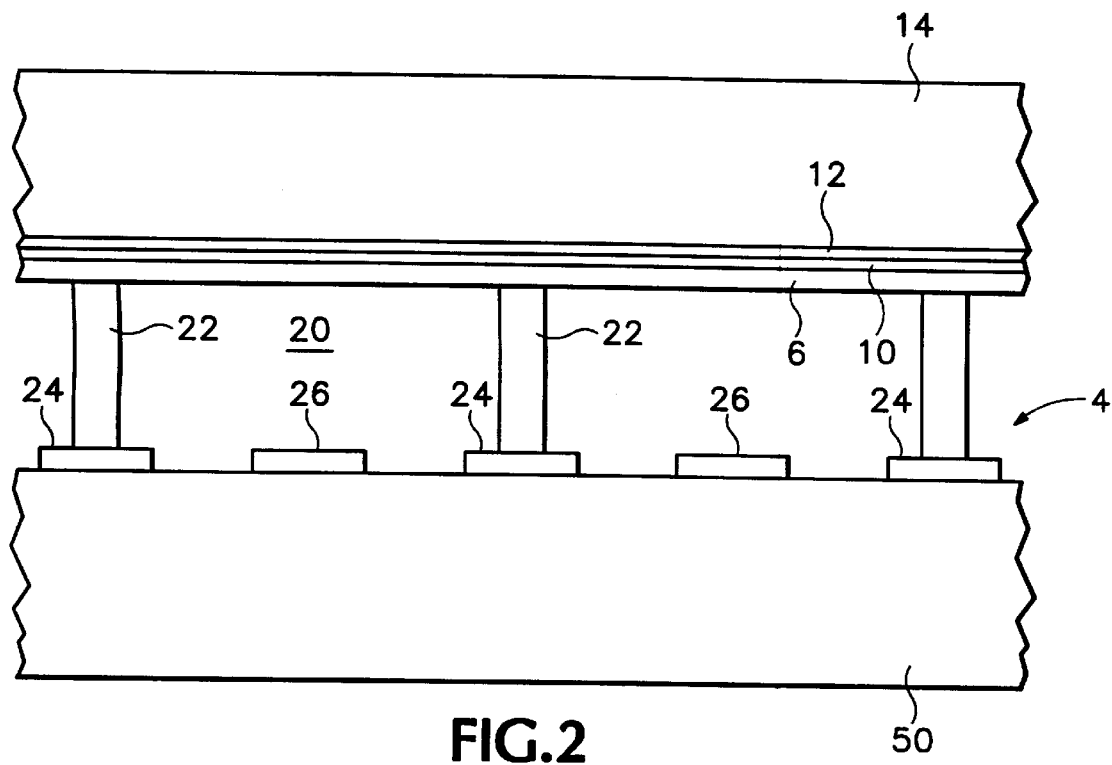
FIG. 2 is a partial sectional view on an enlarged scale of a first PALC display panel in accordance with the present invention.

The channel member 4 of the PALC display panel shown in FIG. 2 includes a glass plate 50 having parallel upper and lower main surfaces. An array of parallel electrode strips is formed on the upper surface of the glass plate 50, for example by screen printing or by depositing a blanket layer of conductive material over the upper surface of the plate and then selectively removing the conductive material by sandblasting or photolithography. The electrode strips are in two sets, alternating across the upper surface of the substrate. The electrode strips of one set are connected together and form anodes 24, whereas the electrode strips of the other set are connected to respective strobe amplifiers and form cathodes 26. A rib 22 is constructed over each anode, so that the anode is exposed along each side of the rib. Accordingly, segments of two anodes are exposed along opposite respective edges of each channel 20 and a cathode is between the two anode segments.

The electrodes have a height in the range from about 0.5 to about 30 μm. The width of the cathode 26 is in the range 30–70 μm and the width of the anode 24 is in the range 35–90 μm.

The ribs 22 have a height of about 80–200 μm, a width of about 15–40 μm and an aspect ratio of at least about 5:1. Preferably, the aspect ratio of the ribs is about 10:1.

The dimensions of the ribs and electrodes do not necessarily scale linearly over the ranges specified, but smaller values of the anode width are generally associated with smaller values of the width and height of the rib.

The combination of dimensions specified with reference to FIG. 2 allows a display pitch of 200–400 μm, which can be used for a high resolution monitor.

Figure 3:
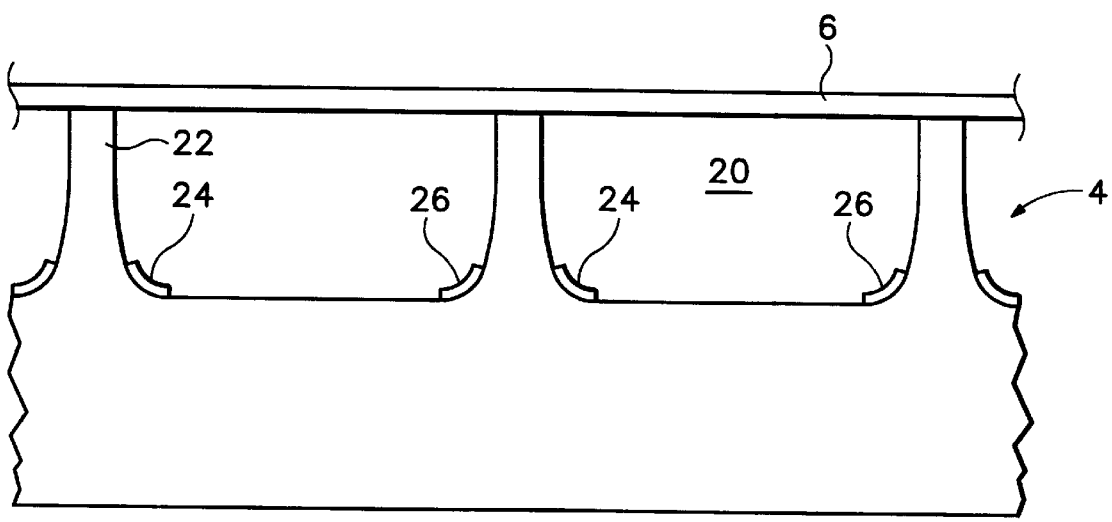
FIG. 3 is a similar view of a second PALC display panel in accordance with the present invention.

A channel plate having ribs with a relatively high aspect ratio, as mentioned in the Dempa announcement, may be used in manufacture of a PALC panel in which two discrete electrodes are exposed in each channel, as shown in FIG. 3. Such a channel plate may be used in a panel that is otherwise similar to that shown in FIG. 1.

It will be appreciated that the invention is not restricted to the particular embodiments that have been described, and that variations may be made therein without departing from the scope of the invention as defined in the appended claims and equivalents thereof.

What is claimed is:

1. A channel member for a PALC panel, comprising:
   a transparent plate having a planar surface,
   at least first and second electrodes on the planar surface of the transparent plate, the first electrode having a width in the range 35–90 μm and a height in the range 0.5–30 μm and the second electrode having a width in the range 30–70 μm and a height in the range 0.5–30 μm, and
   a rib attached to the first electrode and having a width in the range 15–40 μm, a height in the range 80–200 μm and a ratio of height to width of at least about 5:1.

2. A channel member for a PALC panel, comprising:
   a transparent plate having a planar surface,
   first and second anodes and a cathode on the planar surface of the transparent plate, the first and second anodes each having a width in the range 35–90 μm and a height in the range 0.5–30 μm and the cathode being between the first and second anodes and having a width in the range 30–70 μm and a height in the range 0.5–30 μm, and first and second ribs attached to the first and second anodes respectively and each having a width in the range 15–40 μm, a height in the range 80–200 μm and a ratio of height to width of at least about 5:1.

3. A PALC panel including a channel member and a cover sheet sealed to the channel member, wherein the channel member comprises:

a transparent plate having a planar surface, a plurality of parallel strip-form anodes on the planar surface of the transparent plate, each anode having a width in the range 35–90 μm and a height in the range 0.5–30 μm, a plurality of parallel strip-form cathodes on the planar surface of the transparent plate, parallel to the anodes, each cathode being between two adjacent anodes and having a width in the range 30–70 μm and a height in the range 0.5–30 μm, and a plurality of ribs attached to the anodes respectively and each having a width in the range 15–40 μm, a height in the range 80–200 μm and a ratio of height to width of at least about 5:1.

* * * * *